United States Patent [19]

Raaymakers et al.

[11] Patent Number: 5,023,856
[45] Date of Patent: Jun. 11, 1991

[54] OPTICALLY READABLE RECORD CARRIER FOR RECORDING INFORMATION, APPARATUS FOR MANUFACTURING SUCH A RECORD CARRIER, APPARATUS FOR RECORDING INFORMATION ON SUCH A RECORD CARRIER, AND APPARATUS FOR READING INFORMATION RECORDED ON SUCH A RECORD CARRIER

[75] Inventors: Wilhelmus P. M. Raaymakers; Franciscus L. J. M. Kuijpers, both of Eindhoven, Netherlands

[73] Assignee: U.S. Philips Corporation, New York, N.Y.

[21] Appl. No.: 501,342

[22] Filed: Mar. 28, 1990

Related U.S. Application Data

[63] Continuation of Ser. No. 302,129, Jan. 24, 1989, abandoned, which is a continuation of Ser. No. 15,454, Feb. 17, 1987, abandoned.

[30] Foreign Application Priority Data

Oct. 6, 1986 [NL] Netherlands .......................... 8602504

[51] Int. Cl.$^5$ ...................... G11B 7/085; G11B 7/950; G11B 7/24; G11B 7/26
[52] U.S. Cl. ........................................ 369/32; 369/51; 369/94.13; 369/44.25; 369/44.26; 369/275.1
[58] Field of Search ............... 369/275.1, 44.13, 44.14, 369/44.25, 44.26, 47–48, 32, 51, 59; 360/71, 77.06, 71.1, 73.03, 72.2; 358/342

[56] References Cited

U.S. PATENT DOCUMENTS

| | | | |
|---|---|---|---|
| 3,963,862 | 6/1976 | Bouwhuis | 369/109 |
| 4,067,044 | 1/1978 | Maeda et al. | 358/128 |
| 4,238,843 | 12/1980 | Carasso et al. | 369/59 |
| 4,363,116 | 12/1982 | Kleuters et al. | 369/109 |
| 4,366,564 | 12/1982 | de Haan et al. | 369/48 |
| 4,716,560 | 12/1987 | Itonaga | 369/44 |

FOREIGN PATENT DOCUMENTS

| | | | |
|---|---|---|---|
| 54-68610 | 1/1979 | Japan . | |
| 59-05449 | 1/1984 | Japan . | |
| 60-63733 | 4/1985 | Japan . | |
| 2022875 | 12/1979 | United Kingdom | 369/59 |
| 2069219 | 8/1981 | United Kingdom . | |

OTHER PUBLICATIONS

"Philips Technical Review", vol. 40, No. 6, 1982, pp. 151 to 179.

Primary Examiner—Stuart S. Levy
Assistant Examiner—Hoa Nguyen
Attorney, Agent, or Firm—Leroy Eason

[57] ABSTRACT

An optical disc record carrier having a radiation-sensitive surface and a spiral or concentric pattern of information tracks thereon. The radial displacement of each track is modulated to produce a periodic radial wobble, the frequency of such periodic displacement being modulated by a position-information signal identifying the relative positions of the tracks. During recording or reading of information on the tracks the track modulation is read by a scanning beam. A clock signal for controlling scanning velocity is recovered from the track displacement modulation, and an FM demodulator recovers the position-information signal from the frequency modulation of such displacement.

10 Claims, 2 Drawing Sheets

OPTICALLY READABLE RECORD CARRIER FOR RECORDING INFORMATION, APPARATUS FOR MANUFACTURING SUCH A RECORD CARRIER, APPARATUS FOR RECORDING INFORMATION ON SUCH A RECORD CARRIER, AND APPARATUS FOR READING INFORMATION RECORDED ON SUCH A RECORD CARRIER

This is a continuation of application Ser. No. 07/302,129, filed Jan. 24, 1989 now abandoned. This is a continuation of application Ser. No. 015,454, filed Feb. 17, 1987, now abandoned.

BACKGROUND OF THE INVENTION

1. Field of the Invention

The invention relates to an optically readable record carrier comprising a radiation-sensitive layer upon a disc-shaped substrate and having an information recording area arranged in accordance with a spiral or concentric track pattern, which record carrier is intended for the recording and/or reproduction of information in the information recording area by means of a radiation beam, which track pattern exhibits a periodic modulation for the purpose of generating a clock signal for controlling the recording and/or reproducing process.

The invention further relates to an apparatus for manufacturing such a record carrier, comprising a writing device for writing the track pattern by means of a radiation beam and a control device for generating a periodic control signal for the writing device so as to modulate the track pattern at a frequency which corresponds to the frequency of the periodic control signal.

The invention further relates to an apparatus for recording information on such a record carrier, comprising means for scanning the tracks by means of a radiation beam, a modulation device for modulating the radiation beam intensity with an information signal, an optical system with a detector for detecting the radiation reflected or transmitted by the record carrier during scanning, and a device for deriving from the radiation detected by the detector a clock signal for controlling the recording apparatus.

The invention also relates to an apparatus for reading an information signal recorded on the information tracks of such a record carrier, comprising a scanning device for scanning the information tracks with a substantially constant velocity by means of a radiation beam, an optical system with a detector for detecting the radiation reflected or transmitted by the record carrier during scanning, a device for deriving from the detected radiation an information signal representing the recorded information, and a device for further deriving from the detected radiation a clock signal for controlling the reading apparatus.

2. Description of the Related Art

Such a record carrier and apparatus are described in German Offenlegungsschrift No. 3100421, which corresponds to pending U.S. application Ser. No. 110,063, assigned to the present assignee.

The known record carrier has a spiral track which exhibits a track modulation of constant frequency. As the spiral track is scanned by means of the radiation beam during reading and/or recording this track modulation produces a modulation of the reflected radiation beam. This modulation is detected and from the modulation thus detected a clock signal is derived which is utilized for controlling the recording and/or reading process.

Further, the spiral track is provided with information recording areas between which synchronisation areas are interposed. The information recording areas are intended for the recording of information. The synchronisation areas contain position information in the form of the address of the adjacent information recording area. The position information in the synchronization areas makes it possible to derive from the reflected radiation beam during scanning which part of the record carrier is being scanned. This enables a specific part of the disc to be located rapidly and accurately.

However, the known record carrier has the disadvantage that the information recording areas are constantly interrupted by synchronization areas. This is a drawback in particular when EFM-encoded information is to be recorded on the record carrier such because such recording of such information requires an uninterrupted information recording area. EFM-encoding is a method by which groups of 8 data bits at a time are translated into 14 channel bits for recording information on a compact digital disc. This is described, for example, in the article "Compact Disc: System Aspects and Modulation", Philips Tech. Rev. 40, No. 6, 1982.

SUMMARY OF THE INVENTION

It is an object of the invention to enable recording of EFM encoded signals and on an optical disc record carrier, to determine which part of the disc is being scanned by the light beam reflected from the record carrier.

In accordance with a first aspect of the invention a record carrier of the type defined in the opening paragraph is characterized in that the frequency of the track modulation is modulated with a digital position-information signal. In accordance with a second aspect of the invention an apparatus for manufacturing the record carrier is characterized in that such apparatus comprises frequency-modulation means for frequency-modulating the clock signal with a digital position-information signal. In accordance with a third aspect of the invention an apparatus for recording information on such a record carrier is characterized in that the recording apparatus comprises an FM demodulation device for recovering the digital position-information signal from the clock signal. In accordance with a fourth aspect of the invention an apparatus for reading information of the type defined in the foregoing is characterized in that the reading apparatus comprises an FM demodulation device for recovering the digital position-information signal from the clock signal. This enables the clock signal to be generated, the position of the part of the disc being scanned to be determined, and the recording or reading of the information signal to be recorded and/or read, all simultaneously during reading and/or recording.

In an embodiment of the record carrier the clock signal is utilized for controlling the velocity with which the tracks are scanned by the radiation beam during recording and/or reproduction. At the nominal scanning velocity of the tracks the frequency components produced in the modulation of the clock signal by the digital position-information signal are situated substantially outside the frequency band used for velocity control. As such frequency components caused by the track modulation are situated outside the frequency band used for velocity control, the presence of these frequency components does not disturb velocity control.

BRIEF DESCRIPTION OF THE DRAWINGS

Embodiments of the invention and further advantages thereof will now be described in more detail, by way of example, with reference to FIGS. 1 to 6, in which.

DESCRIPTION OF THE PREFERRED EMBODIMENTS

Figure 1:
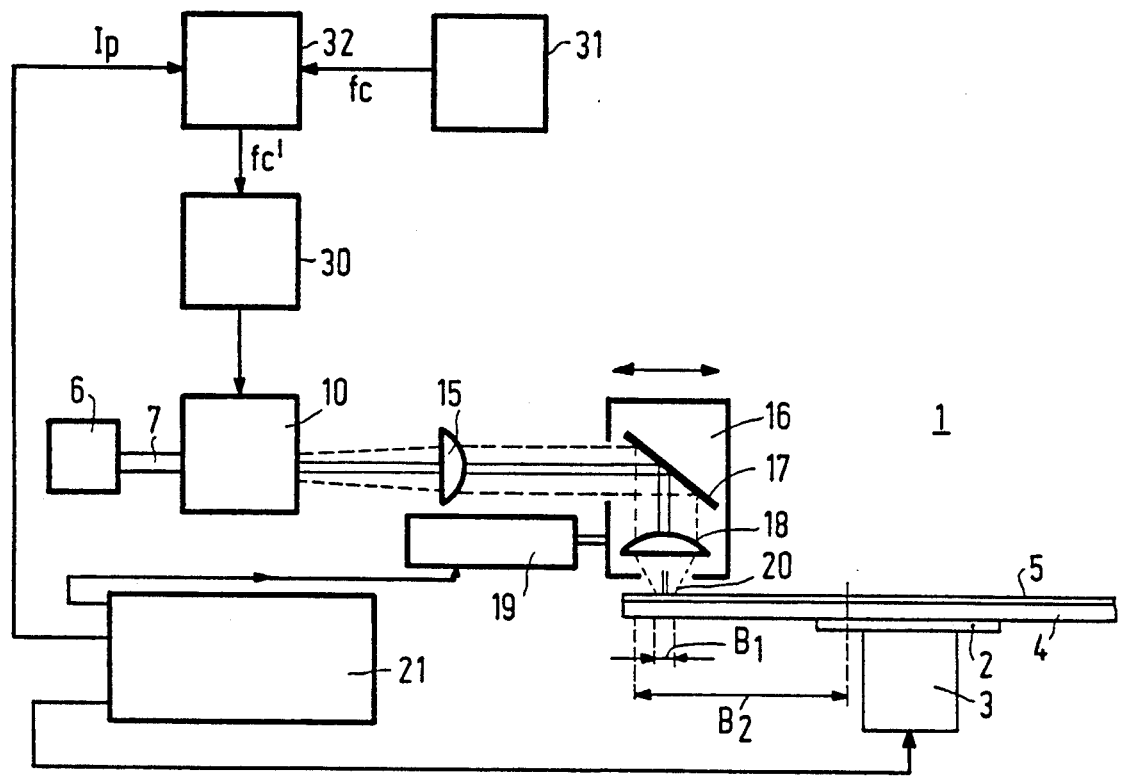
FIG. 1 shows an apparatus in accordance with the invention for manufacturing a record carrier.

FIG. 1 shows an apparatus for manufacturing a record carrier in accordance with the invention. The apparatus 1 comprises a turntable 2 which is rotated by a drive means 3. A disc-shaped record carrier 4 with a light-sensitive layer 5, for example in the form of a photoresist, can be placed on the turntable 2.

A laser 6 produces a light beam 7 which is projected on the light-sensitive layer 5. The light beam 7 is first passed through a deflection device 10. The deflection device 10 is of a type by means of which a light beam can be deflected very accurately within a narrow range. The apparatus described herein suitably employs an acousto-optical modulator as a deflection device. However, it is alternatively possible to use other beam deflection devices, such as for example a mirror which is pivotable through a small angle. The dashed line in FIG. 1 indicates the limits of the deflection range. The light beam 7 deflected by the beam deflection device 10 is directed to an optical head 16 via a lens 15. The optical head comprises a mirror 17 and an object lens 18 for focussing the light beam on the light-sensitive layer 5. The optical head is radially movable relative to the rotating carrier 4 by means of a translation device 19.

By means of the optical system described above the light beam 7 is focussed into a scanning spot 20 on the light-sensitive layer 5, the position of this scanning spot 20 being determined by the degree of deflection of the light beam 7 caused by the beam deflection device 10 and the radial position of the optical head 16 relative to the carrier 4. In the shown position of the optical head 16 the beam deflection device 10 can deflect the scanning spot 20 within a range indicated by B1. This deflection range of the scanning spot can be moved over a larger range indicated by B2 by translation of the optical head 16.

Further the apparatus 1 comprises a voltage-controlled oscillator 30, which generates a control signal for the beam deflection device 10. Such device may be an acousto-optical modulator of a customary type which deflects the light beam through an angle which is determined by the frequency of the control signal supplied by the voltage-controlled oscillator 30. An oscillator 31 generates a signal of constant frequency fc. By means of a frequency modulator 32 the frequency fc of this signal is modulated with a position-information signal Ip generated by a control device 21. The control device 21 further controls the speed of the drive means 3 and the speed of the translating device 19 in such a way that the radiation beam 7 scans the light-sensitive layer with a constant velocity along a spiral track. This control system falls beyond the scope of the present invention and is therefore not described in further detail.

Figure 2:
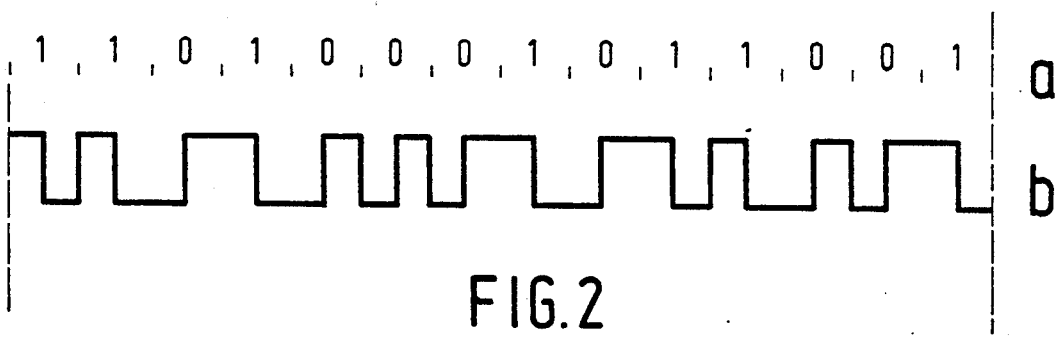
FIG. 2 shows a signal scanning spot position Ip generated in the apparatus shown in FIG. 1.
Figure 3:
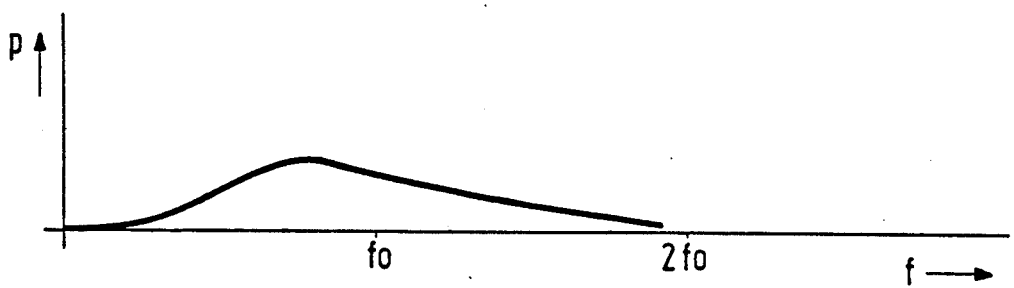
FIG. 3 shows the frequency spectrum of the scanning spot position signal Ip in FIG. 2, FIGS. 4a and 4b show a record carrier in accordance with the invention.

The position-information signal Ip is formed as a binary signal consisting of a sequence of bits having a logic value "1" or "0", which signal represents a sequence of digital time-information code words. These time-information code words indicate the time expired since the beginning of the scanning operation. An example of such a signal Ip is shown in FIG. 2b, a part of the time-information code words represented by the signal Ip being shown in FIG. 2a. The position-information signal Ip exhibits a "biphase" modulation. The applied code word digital signal is converted into a binary signal which is positive during the time interval T/2 for a logic "one" of the applied digital signal and which is negative during the next time interval T/2, T being the bit period of the applied digital signal. A logic "zero" results in the opposite binary signal, i.e. one which is negative during the time interval T/2 and positive during the next time interval T/2. This modulation technique yields a binary signal Ip having a power-distribution frequency spectrum as shown in FIG. 3. Here the frequency fo corresponds to 1/T.

As is apparent from FIG. 3, such a "biphase" modulated signal does not have high power frequency components in the low-frequency range. The advantages of this will be described comprehensively hereinafter.

Figure 4A:
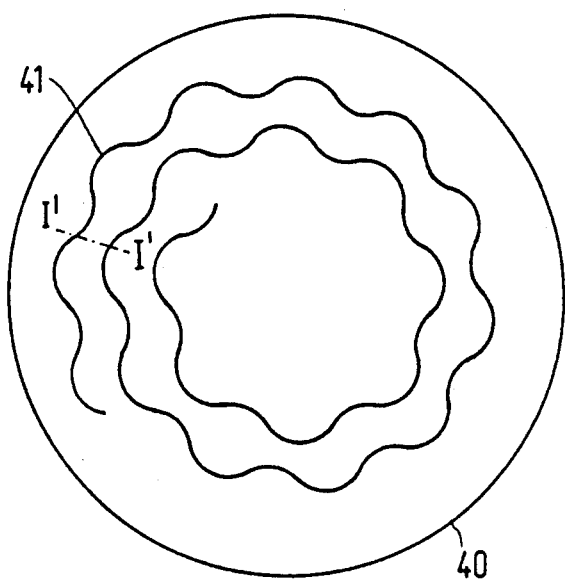
Figure 4B:
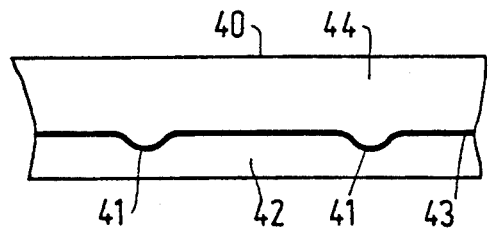

By means of the apparatus shown in FIG. 1 the light-sensitive layer 5 is scanned along a spiral track. Moreover, the scanning spot 20 is moved to and fro over a small distance within the range B1 at a frequency corresponding to the frequency fc' of the output signal of the frequency modulator 32. As a result of this, the spiral track described by the scanning spot 20 on the light-sensitive layer 5 exhibits a radial undulation at a frequency which is modulated with the position-information signal Ip. The light-sensitive layer 5 thus scanned, which layer consists of a photoresist, can subsequently be developed and subjected to a photo-etching process, yielding a master disc in which there is a spiral groove with a radial frequency-modulated undulation (wobble). Subsequently, replicas are made of this master disc, which replicas are provided with a radiation-sensitive information layer. FIGS. 4a and 4b show a record carrier 40 in accordance with the invention, manufactured as described in the foregoing.

FIG. 4a is a plan view of the record carrier 40. The record carrier 40 exhibits a spiral track 41 with the radial wobble. For the sake of clarity the pitch of the spiral and the radial wobble are strongly exaggerated. In reality, the pitch between the consecutive turns of the spiral track is generally of the order of magnitude of 1 to 2 $\mu$m. In practice the period of the radial wobble is suitably such that during reading of an information signal recorded on the record carrier the frequency components produced in the read signal by the radial wobble are situated substantially outside the frequency spectrum of the information signal to be recorded and/or read. If an EFM encoded signal in conformity with the customary "Compact Disc" standard is recorded, a radial wobble causing frequency components near 22 kHz in the read signal with a frequency excursion of 1.5 kHz proves to be adequate. The recorded EFM encoded signal and the radial wobble then hardly influence one another.

FIG. 4b is a sectional view I—I of the record carrier 40 comprising a substrate 42, a radiation sensitive information layer 43, and a transparent coating 44.

Figure 5:
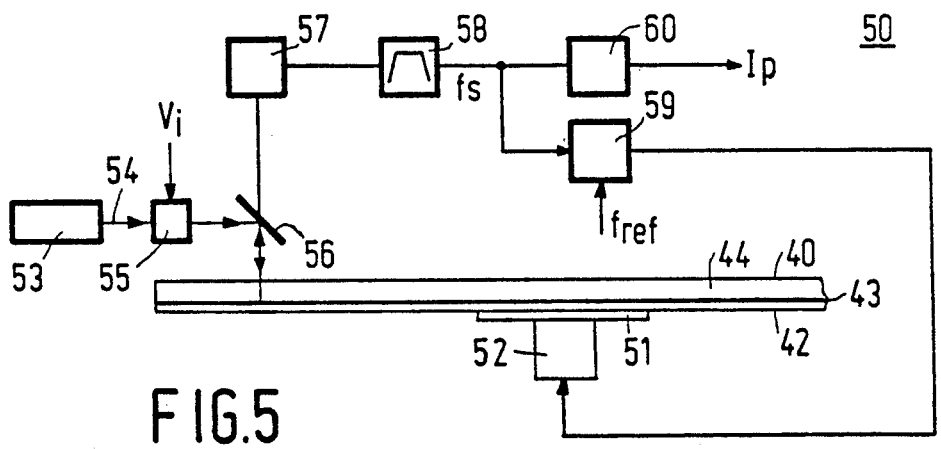
FIG. 5 shows an apparatus in accordance with the invention for recording an information signal.

FIG. 5 shows an apparatus 50 in accordance with the invention for recording an information signal Vi on the record carrier 40. The apparatus 50 comprises a drive means 52 for rotating the record carrier 40 which is placed on a turntable 51. A radiation source 53 produces a radiation beam 54 for scanning the groove 41. The radiation beam 54 is then directed towards the record carrier 40 via a modulation device 55 and a semitransparent mirror 56. By means of the modulation device 55 the intensity of the beam 54 can be modulated depending on an information signal Vi to be recorded, in such a way that an optically detectable information pattern is formed in the information layer 43 at the location of the groove 41. The modulated beam 54 is then partly reflected by the information layer 43. The reflected beam is detected by means of a detection circuit 57. The detection circuit 57 generates an output signal containing frequency components produced by the modulated radial wobble. This output signal is filtered by a band-pass filter 58 which mainly transmits the frequency components caused by the modulated radial wobble. The mean value of the instantaneous frequency fs of this output signal is employed as a measurement signal for controlling the velocity with which the record carrier is scanned by the beam 54 (scanning velocity). This output signal of the band-pass filter 58 is applied to a control circuit 59 for generating a control signal for the drive means 52. The control circuit 59 controls the speed of rotation of the record carrier 40 via the drive means 52 so as to maintain the mean value of the instantaneous frequency fs substantially equal to a reference frequency fref. The control loop thus formed for controlling the scanning velocity of the record carrier has a limited bandwidth, so that rapid frequency variations of the instantaneous frequency fs caused by frequency components outside this limited bandwidth do not affect the control process. As already described, the frequency of the radial wobble in the apparatus 1 for manufacturing the record carrier is modulated with a position-information signal Ip which does not have any high power frequency components in the low-frequency range. If the frequency band used for scanning-velocity control and the frequency spectrum of the position-information signal are adapted to one another in such a way that hardly any frequency components of this frequency spectrum are situated within the velocity control frequency band, the applied FM modulation of the low frequency radial wobble will not affect the controlled scanning velocity.

Satisfactory results in recording EFM encoded signals in conformity with the compact disc standard have been obtained for an fref of approximately 22 kHz, a bit frquency of the position-information signal of approximately 3000 bits/second, and a velocity-control clock signal bandwidth of approximately 100 Hz.

The position-information signal Ip is recovered from the output signal of the filter 58 by means of an FM demodulation circuit 60. This position-information signal Ip indicates the position of the scanned portion of the groove 42 relative to the beginning of the groove expressed in playing time. This position-information signal Ip may be used inter alia for locating the track portion in which an information signal to be recorded is to be stored. Locating this portion falls beyond the scope of the present invention and is therefore not described in further detail.

Figure 6:
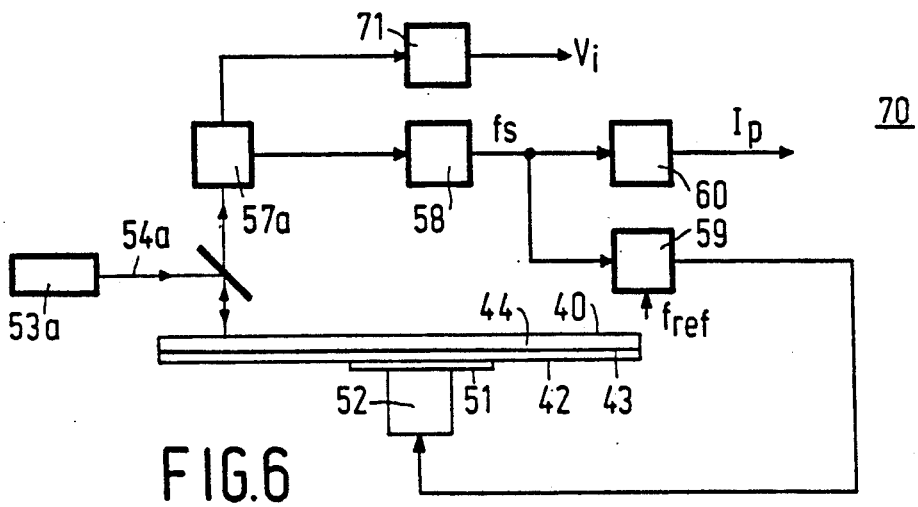
FIG. 6 shows an apparatus in accordance with the invention for reading an information signal.

FIG. 6 shows an apparatus 70 in accordance with the invention for reading the information signal Vi recorded on the record carrier 40, elements corresponding to elements of the apparatus 50 shown in FIG. 5 bearing the same reference numerals. In the apparatus 70 the record carrier 40 on which the information signal Vi is recorded is scanned by a radiation beam 54a produced by a radiation source 53a. The intensity of the radiation beam 54a is too low to produce a change in the optical properties of the information layer 43, so that the information pattern already formed is not overwritten. The information pattern in the spiral groove with the radial wobble modulates and subsequently reflects the radiation beam 54a. The reflected and modulated radiation beam 54a is detected by a detection device 57a. The detection device 57a comprises a first section having an increased sensitivity to the modulation of the light beam produced by the radial wobble and a second section having an increased sensitivity to the modulation produced by the information pattern. Such a detection device is described in detail in the aforementioned Offenlegungsschrift No. 3100421. The signal generated by the first section of the detection circuit 57a is applied to a filter 71 for removing frequency components produced by the radial wobble and by the velocity control, so that the information signal Vi becomes available on the output of the filter 71. In the same way as described with reference to FIG. 5 the scanning velocity is controlled by means of a control circuit 59 and the position-information signal Ip is recovered by means of the FM demodulation circuit 71. Subsequently, the signal Ip may be used, for example, for locating specific portions of the record carrier or for displaying the playing time during reading of the recorded information.

In the foregoing the apparatus for recording information and the apparatus for reading the recorded information have been described as two separate apparatuses. It will obvious to those skilled in the art that the two apparatuses may be readily combined to form a single apparatus both for recording and reading.

In the foregoing a track modulation in the form of a radial wobble has been provided for the purpose of scanning-velocity control in the reading and recording apparatus. It will be evident that other track modulations are also suitable for this purpose, for example those as described in German Offenlegungsschrift No. 3100278 and No. 3100421. In order to obtain a suitable track modulation care must be taken only that the scanning-beam modulation produced by the track modulation can be distinguished from the scanning-beam modulation caused by the information signal Vi and that the frequency componets of these scanning-beam modulations are situated substantially outside the frequency band used for scanning-velocity control.

What is claimed is:

1. An optical disc record carrier having a radiation-sensitive surface for recording information in a pattern of spiral or concentric tracks thereon, which information may be recorded or read by scanning such tracks with a radiation beam which produces radiation therefrom; characterized in that each of said tracks has a periodic modulation of its position in a direction transverse thereto and which, without occupying any portion of the track, generates a periodic clock signal in the radiation therefrom having a substantially constant frequency corresponding to the velocity of scanning of said tracks, the frequency of said clock signal only varying in accordance with variations in said scanning velocity; and in that the frequency of said clock signal is modulated in accordance with a digital position signal which identifies the relative positions of said tracks on said record carrier; whereby said scanning velocity and the relative positions of said tracks are both recorded without occupying any portion of said tracks.

2. A record carrier as claimed in claim 1, wherein the frequency components of the modulation of said clock signal which are produced by the digital position signal are substantially outside the frequency band of the variations in the frequency of said clock signal caused by variations in said scanning velocity.

3. A record carrier as claimed in either of claims 1 and 2, wherein the digital position signal which is generated at any position in said track pattern indicates the time from the beginning of said track pattern to such track position when scanning is effected at a velocity corresponding to the frequency of said clock signal.

4. A record carrier as claimed in either of claims 1 and 2, wherein said track modulation is in the form of a periodic wobble in the radial displacement of each of said tracks, the frequency of such wobble being modulated by said digital position signal.

5. Apparatus for manufacturing an optical disc record carrier having a radiation sensitive surface for recording information in a pattern of spiral or concentric tracks thereon, comprising:

means for scanning a radiation beam across the surface of said record carrier to form said track pattern thereon;
 means for generating a periodic control signal for said scanning means which modulates the position of each of said tracks in a direction transverse thereto at a substantially constant frequency corresponding to the velocity of scanning of said tracks, wherein the mean frequency of said control signal only varying in accordance with variations in said scanning velocity; and
 means for modulating the frequency of said control signal with a digital position signal which identifies the relative positions of each of said tracks on said record carrier;
 whereby said scanning velocity and the relative positions of said tracks are both recorded without occupying any portion of said tracks.

6. An apparatus as claimed in claim 5, wherein the digital position signal for any track signifies the time for said radiation beam to scan from the beginning of said track pattern to such track when such scanning is effected at a substantially constant velocity corresponding to the mean frequency of said modulated control signal.

7. Apparatus for recording information on an optical disc record carrier having a radiation-sensitive surface patterned in spiral or concentric tracks thereon which when scanned by a radiation beam produce radiation therefrom; the position of each of said tracks in a direction transverse thereto having a periodic modulation which, without occupying any portion of the track, generates a periodic clock signal in the radiation produced therefrom, such clock signal having a substantially constant frequency corresponding to the velocity of scanning of said tracks, which frequency is modulated by a digital position signal identifying the relative positions of said tracks on said record carrier, wherein the mean frequency of said clock signal only varying in accordance with variations in said scanning velocity; such apparatus comprising:

means for producing a radiation beam which is scanned across said track pattern to record information thereon and produce radiation therefrom;
 optical means for detecting the radiation produced from said tracks;
 means for deriving from the radiation detected by said optical means the frequency modulated periodic clock signal generated by said tracks during scanning thereof;
 means for deriving from said frequency modulated clock signal a speed control signal for controlling said scanning velocity; and
 frequency demodulation means for demodulating said frequency modulated periodic clock signal to recover therefrom said digital position signal.

8. Apparatus as claimed in claim 7, further comprising means for controlling said radiation beam to scan said track pattern at a substantially constant velocity corresponding to the mean frequency of said frequency modulated periodic clock signal.

9. Apparatus for reading information recorded on an optical disc record carrier having a radiation-sensitive surface patterned in spiral or concentric tracks thereon which when scanned by a radiation beam produce radiation therefrom, the position of each of said tracks in a direction transverse thereto having a periodic modulation which, without occupying any portion of a track, constitutes a frequency modulated periodic clock signal having a substantially constant frequency corresponding to the velocity of scanning of said tracks, the frequency modulation thereof being a digital position signal which identifies the relative positions of said tracks on said record carrier, wherein the frequency of said clock signal only varies in accordance with variations in said scanning velocity; the radiation from said tracks also including an information signal corresponding to information recorded on said tracks; such apparatus comprising:

means for scanning a radiation beam across said track pattern to produce radiation therefrom;
 optical means for detecting the radiation so produced;
 means for deriving said information signal from the radiation detected by said optical means;
 means for further deriving said frequency modulated clock signal from the radiation detected by said optical means;
 means for deriving from said frequency modulated clock signal from the radiation detected by said optical means;
 means for deriving from said frequency modulated clock signal a speed control signal corresponding to the mean frequency thereof for controlling the scanning velocity; and
 means for frequency demodulating said frequency modulated clock signal to recover therefrom said digital position signal.

10. Apparatus as claimed in claim 9, further comprising means for controlling said radiation beam to scan said track pattern at a substantially constant velocity corresponding to the mean frequency of said frequency modulated periodic clock signal.

* * * * *